(12) United States Patent
Chen et al.

(10) Patent No.: US 9,344,141 B2
(45) Date of Patent: May 17, 2016

(54) ELECTRONIC DEVICE AND DATA CONTROL METHOD

(71) Applicant: Industrial Technology Research Institute, Hsinchu (TW)

(72) Inventors: Jia-Ming Chen, Kaohsiung (TW); Jia-Wei Liu, Taoyuan County (TW); Ming-Chien Tseng, Hsinchu County (TW); Shi-Yang Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 215 days.

(21) Appl. No.: 14/144,234

(22) Filed: Dec. 30, 2013

(65) Prior Publication Data

US 2015/0003339 A1  Jan. 1, 2015

(30) Foreign Application Priority Data

Jul. 1, 2013 (TW) .............................. 102123428 A

(51) Int. Cl.
*H04W 72/04* (2009.01)
*H04B 1/48* (2006.01)
*H04L 5/14* (2006.01)

(52) U.S. Cl.
CPC ... *H04B 1/48* (2013.01); *H04L 5/14* (2013.01)

(58) Field of Classification Search
CPC . H04W 72/0406; H04W 76/02; H04W 84/12; H04B 10/25752; H04B 10/2507
USPC ............... 370/329; 398/116, 139, 22, 58, 115
See application file for complete search history.

(56) References Cited

U.S. PATENT DOCUMENTS

| 7,733,825 | B2 | 6/2010 | Kim et al. |
| 7,773,887 | B2 | 8/2010 | Lee et al. |
| 7,796,891 | B2 | 9/2010 | Lee et al. |

(Continued)

FOREIGN PATENT DOCUMENTS

| CN | 1042884 | 4/1999 |
| CN | 101286784 | 10/2008 |

(Continued)

OTHER PUBLICATIONS

IEEE P802.16m D7,D8, the IEEE 802.16m Standard / Air Interface for Broadband Wireless Access Systems Amendment 3: Advanced Air Interface, IEEE Std 802.16m, Mar. 2011, 1,106 pages, IEEE, US.

(Continued)

*Primary Examiner* — Charles C Jiang
*Assistant Examiner* — Wali Butt

(57) ABSTRACT

The disclosure provides an electronic device including a coupler, a transceiver, and a control circuit. The coupler generates a coupled downlink signal according to a downlink signal from a head-end unit. The transceiver switches between the transmission of a downlink signal and the reception of an uplink signal according to a control signal. The control circuit receives the coupled downlink signal, generates a status counting signal according to the power status of the coupled downlink signal, and generates the control signal according to the status counting signal. Only when the level of the coupled downlink signal is lower than an amplitude threshold level with a duration longer than a status counting time, the control circuit converts the status counting signal from a first logic level to a second logic level opposite to the first logic level. Otherwise, the control circuit maintains the status counting signal on the first logic level.

23 Claims, 6 Drawing Sheets

(56) References Cited

U.S. PATENT DOCUMENTS

| | | | |
|---|---|---|---|
| 7,831,213 | B1 | 11/2010 | Rausch et al. |
| 7,855,983 | B2 | 12/2010 | Knecht et al. |
| 7,961,689 | B2 | 6/2011 | Stratford |
| 8,041,222 | B2 | 10/2011 | Lee et al. |
| 8,059,963 | B2 | 11/2011 | Kim et al. |
| 8,310,963 | B2 | 11/2012 | Singh |
| 2007/0258432 | A1 | 11/2007 | Lee et al. |
| 2008/0056167 | A1 | 3/2008 | Kim et al. |
| 2008/0219670 | A1 | 9/2008 | Kim et al. |
| 2009/0318089 | A1* | 12/2009 | Stratford ............... H04W 92/18 55/67.11 |
| 2012/0149321 | A1 | 6/2012 | Montalvo et al. |
| 2012/0263256 | A1 | 10/2012 | Waheed et al. |
| 2012/0281565 | A1 | 11/2012 | Sauer |
| 2013/0058281 | A1 | 3/2013 | Berlin et al. |
| 2014/0050482 | A1* | 2/2014 | Berlin .................... H04B 7/155 398/115 |

FOREIGN PATENT DOCUMENTS

| | | |
|---|---|---|
| CN | 101436885 | 5/2009 |
| CN | 101754348 | 6/2010 |
| CN | 102523035 | 6/2012 |
| CN | 102664681 | 9/2012 |
| EP | 0843420 | 5/1998 |
| EP | 1227605 | 7/2002 |
| EP | 1237298 | 9/2002 |
| EP | 1080550 | 3/2003 |
| EP | 2083592 | 7/2009 |
| JP | 2001313586 | 11/2001 |
| JP | 2011-525755 | 9/2011 |
| TW | 200943698 | 10/2009 |
| TW | 201206101 | 2/2012 |
| WO | WO 2009053288 | 4/2009 |
| WO | WO 2010093574 | 8/2010 |
| WO | WO 2011017700 | 2/2011 |

OTHER PUBLICATIONS

3GPP, "Tech. Spec. 36.211 V9.1.0, the 3GPP LTE Standard," Mar. 2010, 3GPP Organization Partners , France.

M.J. Crisp et al., "Novel Time Domain Bias Switching of Radio over Fiber Links for Enhanced Sensitivity in Time Division Duplexed Services," 2007 International Topical Meeting on Microwave Photonics, 2007, pp. 104-107, IEEE, US.

Hoon Kim et al., "Radio-Over-Fiber System for TDD-Based OFDMA Wireless Communication Systems," Journal of Lightwave Technology, Nov. 2007, pp. 3419-3427, vol. 25, No. 11, IEEE, US.

C. H. Yeh et al., "Performance and limitation of radio-over-fiber network using standard WiMAX," 2009 International Conference on Wireless and Optical Communications Network (WOCN'09), Apr. 2009, pp. 1-4, IEEE, US.

Ming-Li Yee et al., "Performance analysis of IEEE 802.16e WiMAX Radio-over-fiber distributed antenna system," 2009 Microwave Symposium Digest (MTT'09), Jun. 2009, pp. 197-200, IEEE, US.

Ying Zhang et al., "Bias circuit design of Rf power amplifiers for TDD systems," 2011 International Conference on Electronics, Communication and Control (ICECC), Sep. 2011, pp. 2572-2575, IEEE, US.

Y. Okamoto et al., "Radio-on-fiber access network systems for road-vehicle communication," in 2001 IEEE Pro. Intelligent Transportation Systems, Aug. 2001, pp. 1050-1055, IEEE, US.

M. Garcia Larrode et al., "Transparent Transport of Wireless Communication signals in radio-overfiber systems," 2005, 8 pages.

Chien-Hung Yeh et al., "Theory and Technology for Strandard WiMAX Over Fiber in High Speed Train Systems," Journal of Lightwave Technology, Aug. 2010, pp. 2327-2336, vol. 28, No. 16, IEEE, US.

Qiang Liu et al., "Network planning for WiMAX-R Networks," Journal of Universal Computer Science, May 2012, pp. 1194-1217, vol. 18, No. 9, J.UCS, US.

M Boldi et al., " D1.8 Intermediate Report on CoMP (Coordinated Multi-Point) and Relaying in the Framework of CoMP," Celtic Telecommunication Solutions, Oct. 2009, 75 pages, Eurescom GmbH, Germany.

Christian F.A. Lanzani et al., "4G Mobile Networks: An Analysis of Spectrum Allocation, Software Radio Architectures and Interfacing Technology," Dec. 2012, Industrial Ph. D. Thesis, 202 pages, Denmark.

M Boldi et al., "Preliminary Winner+ System Concept," Celtic Telecommunication Solutions, May 2009, 65 pages, Eurescom GmbH, Germany.

Christos V. Papathanasiou, "Radio Resource Management with Cross-Layer Designs in Broadband Wireless Access Networks," A Dissertation Submitted to the Computer and Communications Engineering of University of Thessaly, Dec. 2010, 192 pages, University of Thessaly, Greece.

Tao Chen, "MAC Layer Investigation and Design for Gigabit Wireless LAN", PhD Dissertation for University of Trento, Mar. 2007, 226 pages, Italy.

Vmbs Caravalho, "Tecnicas de cooperacao entre estacoes base pera sistemas celulares," 2011, 81 pages, Universidade de Aveiro, Portugal.

Mario Garcia Lozano, "Contribution to Wireless Access Optimization and Dynamic Enhancement of WCDMA Networks," Ph. D. thesis for University Politecnica de Catalunya, Jul. 2011, 262 pages, Spain.

Taiwan Patent Office, Office Action, Patent Application Serial No. 102123428, Mar. 24, 2015, Taiwan.

Ming-Chien Tseng et al. Development and Field Trial of WiMAX Dedicated Radio Over Fibert System Over THSR Scenario:, ICL Technical Journal, Oct. 2012, pp. 126-133, vol. 147, Taiwan.

Japan Patent Office, Office Action, Patent Application Serial No. 2013-269283, Jan. 28, 2015, Japan.

Japan Patent Office, Office Action, Patent Application Serial No. 2013-269283, Dec. 9, 2015, Japan.

* cited by examiner

ELECTRONIC DEVICE AND DATA CONTROL METHOD

CROSS REFERENCE TO RELATED APPLICATION

This application claims priority of Taiwan Patent Application No. 102123428, filed on Jul. 1, 2013, the entirety of which is incorporated by reference herein.

BACKGROUND

1. Technical Field

The disclosure relates to an electronic device and a control method for a Time Division Duplexing (TDD) communication system.

2. Description of the Related Art

A distributed antenna system (DAS) applying radio over fiber (RoF) technology has been widely used in wireless communications in high-speed environments. Generally, the RoF system consists of a head-end unit (HEU) and a remote antenna unit (RAU). However, in the TDD system, if the RAU does not switch between the signal transmission and the signal reception at a proper time, it may lose the packets of downlink signals or uplink signals. Therefore, an electronic device and a control method for effectively switching between the signal transmission and the signal reception are needed.

SUMMARY

In an embodiment of the disclosure, an electronic device coupling the downlink signal to a control signal generator is provided to generate a control signal. The control signal generator determines whether the downlink signal has ended or not, and adjusts a time-sequence to synchronize the control signal and the downlink signal. The electronic device provided by the present invention provides a high degree of isolation for downlink signals and uplink signals of the communication system, and is suitable for applying in all kinds of communication systems, especially the fourth generation of the wireless communication system (such as 802.16) and the TDD communication system.

The disclosure provides an electronic device to receive at least one downlink signal and at least one uplink signal. The electronic device includes a coupler, a transceiver, and a control circuit. The coupler is arranged on a downlink path and generates a coupled downlink signal according to a downlink signal from a head-end unit. The transceiver switches between the transmission of a downlink signal and the reception of an uplink signal according to a control signal. The control circuit receives the coupled downlink signal, generates a status counting signal according to the power status of the coupled downlink signal, and generates the control signal according to the status counting signal. Only when the level of the coupled downlink signal is lower than an amplitude threshold level with a duration longer than a status counting time, the control circuit converts the status counting signal from a first logic level to a second logic level opposite to the first logic level. Otherwise, the control circuit maintains the status counting signal on the first logic level.

The disclosure provides a control method for an electronic device receiving at least one downlink signal and at least one uplink signal. The electronic device includes a coupler, a transceiver, and a control circuit. The coupler is arranged on a downlink path. The control method includes generating a coupled downlink signal according to a downlink signal from a head-end unit, generating a status counting signal according to the power status of the coupled downlink signal, and generating the control signal according to the status counting signal. Only when the level of the coupled downlink signal is lower than an amplitude threshold level with a duration longer than a status counting time, the control circuit converts the status counting signal from a first logic level to a second logic level opposite to the first logic level. Otherwise, the control circuit maintains the status counting signal on the first logic level.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1A:
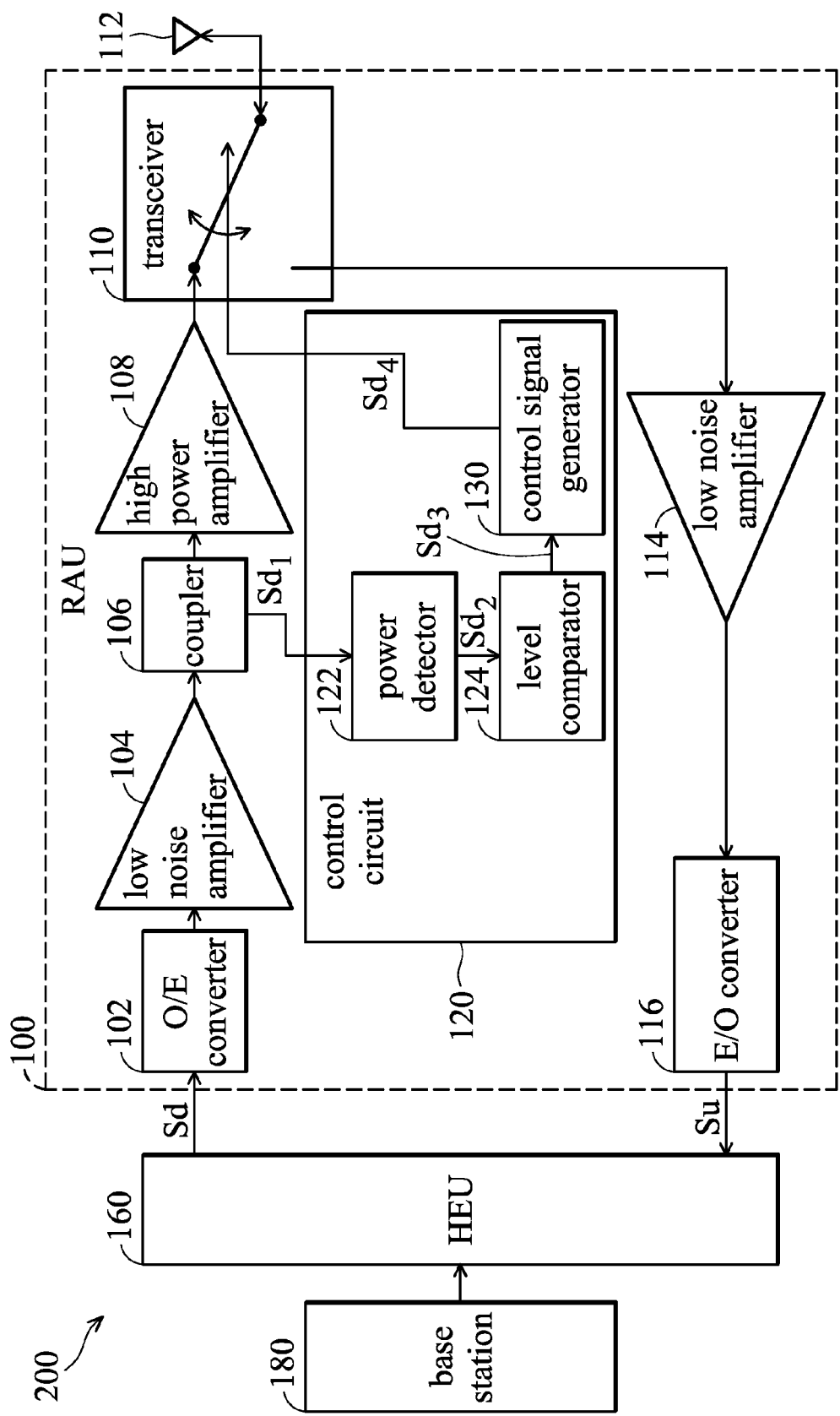
FIG. 1A is the schematic diagram of an electronic device according to an embodiment of the present disclosure.

FIG. 1A is a schematic diagram of an electronic device according to an embodiment of the present disclosure. Referring to FIG. 1, the RoF system 200 includes a HEU 160 and a RAU 100. Specifically, a base station 180 transmits a signal to the HEU 160. The HEU 160 performs an electronic-to-optical conversion on a downlink signal Sd, and transmits it to the RAU 100 by a fiber. The RAU 100 includes an optical-to-electrical (O/E) converter 102, a low noise amplifier (LNA) 104, a coupler 106, a high power amplifier (HPA) 108, a transceiver 110, a low noise amplifier 114, an electrical-to-optical (E/O) converter 116 and a controller 120. The O/E converter 102 of the RAU 100 converts the received downlink signal Sd to a radio-frequency (RF) signal, and transmits it in sequence to the LNA 104 for amplifying the RF signal. Afterwards, the RF signal amplified by the LNA 104 is transmitted to the coupler 106. Afterwards, the coupler 106 transmits the coupled downlink signal to the HPA 108 to amplify the coupled downlink signal. Afterwards, the downlink signal amplified by the high power is transmitted to the transceiver 110 for switching of the transmission. Finally, the antenna 112 transmits the downlink signal amplified by the high power.

On the other hand, the RAU 100 receives an uplink signal Su, then transmits it in sequence to the LNA 114 for amplifying the uplink signal Su, then transmits it to the E/O converter 116 for converting to an optical signal, then transmits it to the HEU 160 and the base station 180 by a fiber. In this embodiment, the O/E converter 102, the LNA 104, the coupler 106, the control circuit 120 and the HPA 108 compose a downlink path. The LNA 114 and the E/O converter 116 compose an uplink path, but it is not limited thereto. In some embodiments, some elements of the uplink path and the downlink path could be omitted or changed.

Figure 1B:
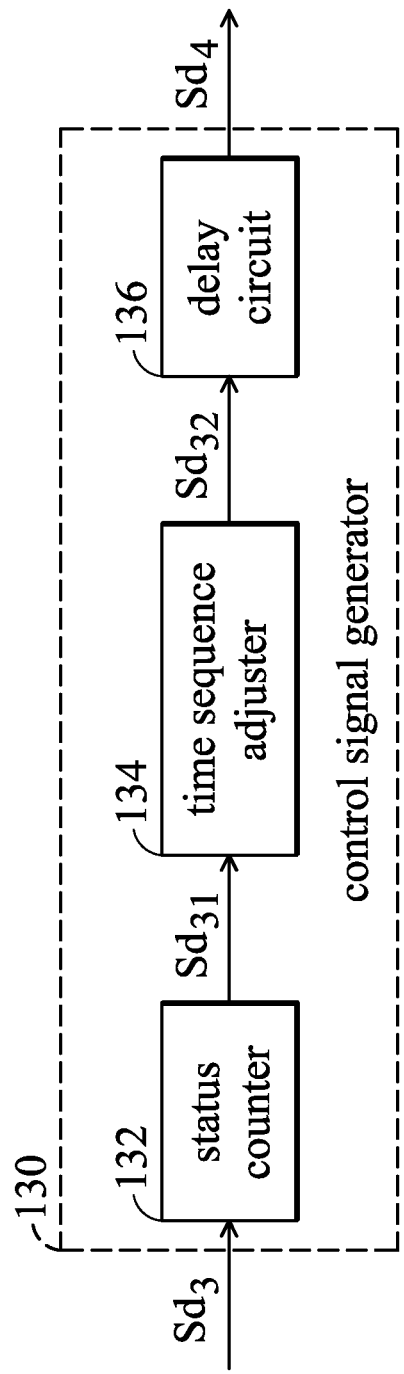
FIG. 1B is the schematic diagram of a control signal generator according to an embodiment of the present disclosure.

It should be noted that the coupler 106 transmits the downlink signal Sd to the HPA 108 and the transceiver 110, and also transmits a coupled downlink signal $Sd_1$ to the control circuit 120. As shown in FIG. 1A, the control circuit 120 is coupled between the coupler 106 and the transceiver 110. The control circuit 120 generates a status counting signal $Sd_{31}$ according to the power status of the coupled downlink signal $Sd_1$ (as shown in FIG. 1B), and generates the control signal $Sd_4$ according to the status counting signal $Sd_{31}$, and transmits the control signal $Sd_4$ to the transceiver 110. Specifically, the control circuit 120 includes a power detector 122, a level comparator 124 and a control signal generator 130. The power detector 122 is coupled between the coupler 106 and the level comparator 124, and receives the coupled downlink signal $Sd_1$ transmitted by the coupler 106, and detects the power of the coupled downlink signal $Sd_1$ to generate a power detecting signal $Sd_2$.

In one embodiment, the level comparator 124 is coupled between the power detector 122 and the control signal generator 130 for generating a level comparison signal $Sd_3$ according to the power detecting signal $Sd_2$. Specifically, the level comparator 124 maintains the level comparison signal $Sd_3$ on a first logic level when the level of the power detecting signal $Sd_2$ is greater than or equal to an amplitude threshold value $\lambda_1$, and maintains the level comparison signal $Sd_3$ on a second logic level when the level of the power detecting signal $Sd_2$ is lower than the amplitude threshold value $\lambda_1$. In addition, the control signal generator 130 includes a status counter 132, a time-sequence adjuster 134 and a delay circuit 136. The control signal generator 130 generates the control signal $Sd_4$ according to the received level comparison signal $Sd_3$, so that the transceiver 110 can switch between the transmission of the downlink signal Sd and the reception of the uplink signal Su. In another embodiment, the control signal generator 130 is implemented by a field programmable gate array (FPGA). In another embodiment, the control signal generator 130 is implemented by a micro-controller.

Figure 2A:
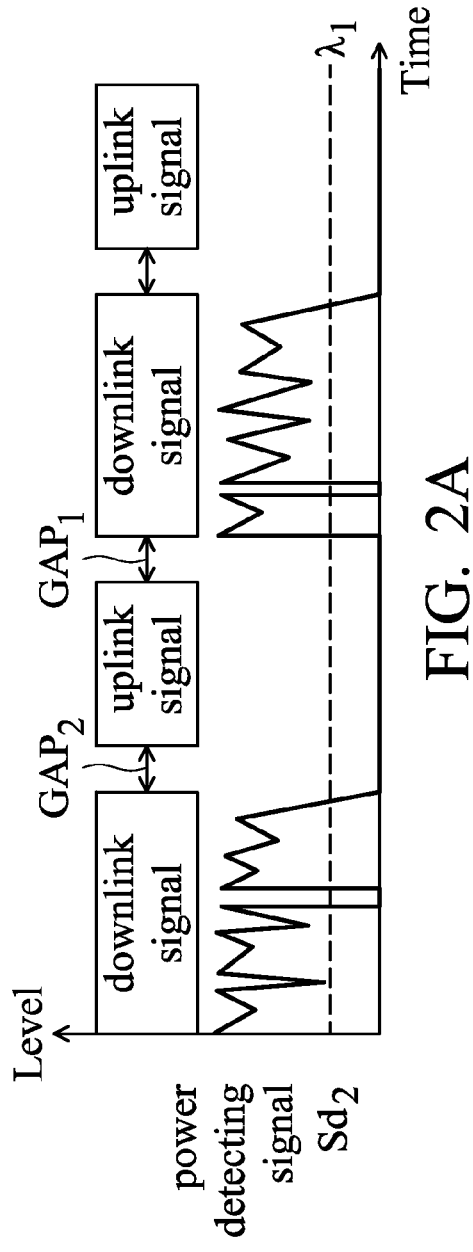
FIG. 2A is the schematic diagram of the output of the power detector according to an embodiment of the present disclosure.
Figure 2B:
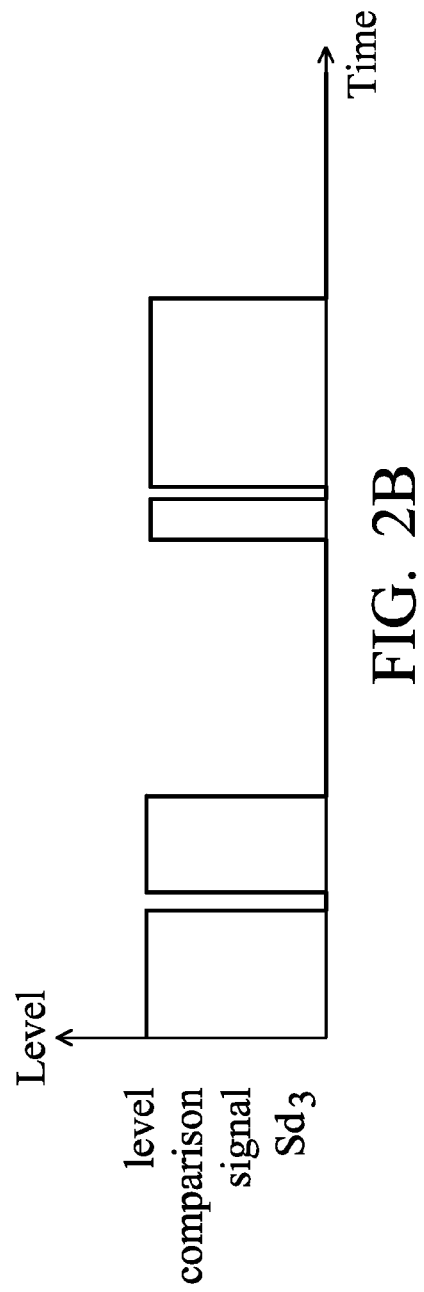
FIG. 2B is the schematic diagram of the output of the level comparator according to an embodiment of the present disclosure.

FIGS. 2A and 2B are schematic diagrams of the outputs of the power detector 122 and level comparator 124 according to an embodiment of the present disclosure. The RAU 100 receives the downlink signal transmitted by the HEU 160, or transmits the received uplink signal to the HEU 160. Therefore, there are a receive/transmit transition gap ($GAP_1$) and a transmit/receive transition gap ($GAP_2$) when switching between the uplink and downlink signals. As shown in FIG. 2A, the $GAP_1$ is the first switching time for an uplink signal switched to a downlink signal, i.e., the receive/transmit transition gap. The $GAP_2$ is the second switching time for a downlink signal switched to an uplink signal, i.e., the transmit/receive transition gap. In one embodiment, the level comparator 124 receives the power detecting signal $Sd_2$, compares the amplitude of the power detecting signal $Sd_2$ with the amplitude threshold value $\lambda_1$, and generates the level comparison signal $Sd_3$. The level comparator 124 maintains the level comparison signal $Sd_3$ on a first logic level when the level of the power detecting signal $Sd_2$ is greater than or equal to an amplitude threshold value $\lambda_1$, and maintains the level comparison signal $Sd_3$ on a second logic level when the level of the power detecting signal $Sd_2$ is lower than the amplitude threshold value $\lambda_1$. In this embodiment, the first logic level is high level, and the second logic level is low level (such as 0 volt), but it is not limited thereto. In some embodiments, the first logic level is low level, and the second logic level is high level. Finally, as shown in FIG. 2B, the level comparator 124 transmits the level comparison signal $Sd_3$ having the first logic level and the second logic level to the control signal generator 130. It should be noted that the amplitude threshold value $\lambda_1$ is lower than the minimum power value of the downlink signal Sd, and the minimum power value is a non-zero value.

Figure 2C:
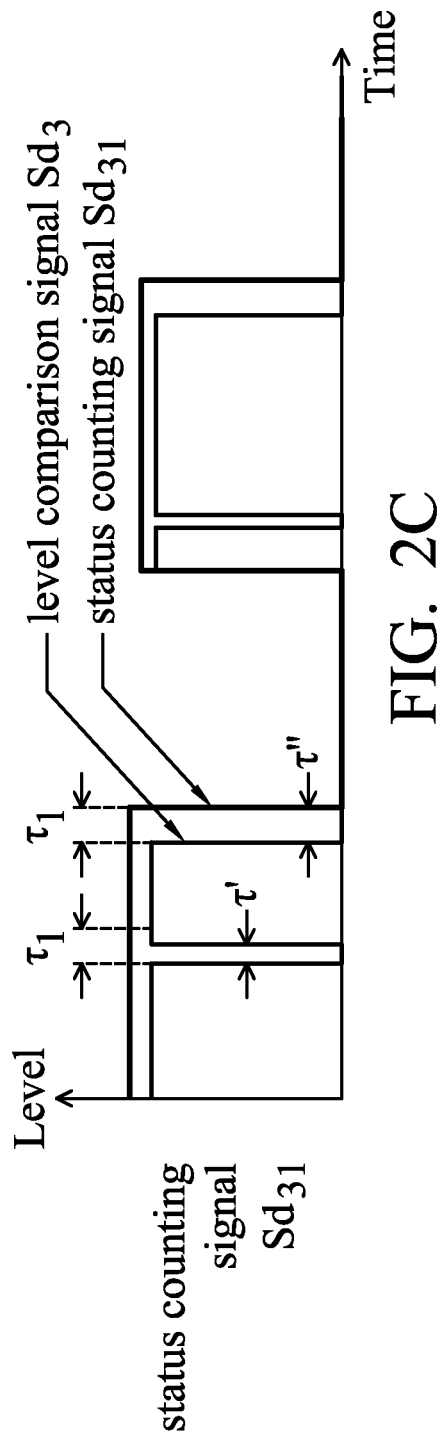
FIG. 2C is the schematic diagram of the output of the status counter according to an embodiment of the present disclosure.

FIG. 1B is a schematic diagram of a control signal generator according to an embodiment of the present disclosure. As shown in FIG. 1, the control signal generator 130 includes a status counter 132, a time-sequence adjuster 134 and a delay circuit 136. In one embodiment, the status counter 132 determines whether the received level comparison signal $Sd_3$ is switched from a first logic level to a second logic level opposite to the first logic level, and generates a status counting signal $Sd_{31}$. As shown in FIG. 2C, when the level comparison signal $Sd_3$ is on the first logic level, the status counter 132 maintain the status counting signal $Sd_{31}$ on the first logic level. When the level comparison signal $Sd_3$ is on the second logic level and longer than (greater than or equal to) a status counting time $\tau_1$ (i.e., $\tau'' > \tau_1$), the status counter 132 switches or transforms the status counting signal $Sd_{31}$ from the first logic level to the second logic level. When the level comparison signal $Sd_3$ is on the second logic level and is not longer than the status counting time $\tau_1$ (i.e., $\tau' < \tau_1$), the status counter 132 maintains the status counting signal $Sd_{31}$ on the first logic level. It should be noted that the status counting time $\tau_1$ is greater than or equal to the duration of a resource block. Because a plurality of pilot signals will be interlaced within the resource block, even the downlink sub-carrier transmitted by the downlink signal Sd does not carry data, the transmission time of the downlink signal Sd for not transmitting data does not exceed the duration of a resource block. If exceeding the duration of the resource block, the signal transmitted by the RoF system 200 must be the uplink signal Su rather than the downlink signal Sd. In another embodiment, when the level comparison signal $Sd_3$ is on the first logic level, the counting value of the status counter 132 is reset to zero and maintains the status counting signal $Sd_{31}$ on the first logic level. When the level comparison signal $Sd_3$ is on the second logic level, the status counter 132 starts counting so that the counting value starts increasing. If the time indicated by the counting value is greater than the status counting time $\tau_1$, the status counter 132 switches or transforms the status counting signal $Sd_{31}$ from the first logic level to the second logic level. If the time indicated by the counting value is lower than the status counting time $\tau_1$, the status counter 132 maintains the status counting signal $Sd_{31}$ on the first logic level.

In another embodiment, when the level comparison signal $Sd_3$ is on the first logic level, the status counter 132 maintains the status counting signal $Sd_{31}$ on a third logic level. When the level comparison signal $Sd_3$ is on the second logic level and is longer than the status counting time $\tau_1$, the status counter 132 switches or transforms the status counting signal $Sd_{31}$ from the third logic level to a fourth logic level opposite to the third logic level. When the level comparison signal $Sd_3$ is on the second logic level and is not longer than the status counting time $\tau_1$, the status counter 132 maintains the status counting signal $Sd_{31}$ on the third logic level. In this embodiment, the first and third logic levels are high levels, and the second and fourth logic levels are low levels (such as zero volt), but it is not limited to. In one embodiment, the first and the third logic levels are low levels, and the second the fourth logic levels are high levels. In another embodiment, the first and the fourth logic levels are low levels, and the second the third logic levels are high levels.

Figure 2D:
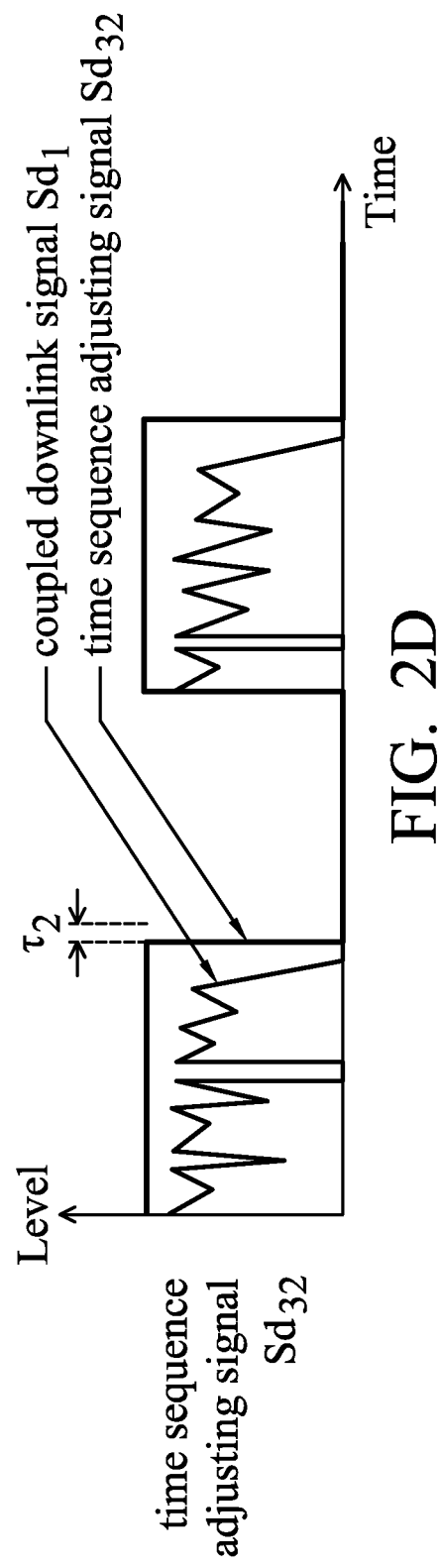
FIG. 2D is the schematic diagram of the output of the time-sequence adjuster according to an embodiment of the present disclosure.

Afterwards, the time-sequence adjuster 134 receives the status counting signal $Sd_{31}$. As shown in FIG. 2D, the time-sequence adjuster 134 advances the time of the status counting signal $Sd_{31}$ switched from the first logic level to the second logic level by a time-sequence adjusting time $\tau_2$, and generates a time-sequence adjusting signal $Sd_{32}$. It should be noted that the range of the time-sequence adjusting time $\tau_2$ is:

$$\tau_1 > \tau_2 > \tau_1 - (GAP_1 + GAP_2)/2$$

$\tau_2$ is the time-sequence adjusting time, $\tau_1$ is the status counting time, $GAP_1$ is the duration for any one of the at least one uplink signal switched to any one of the at least one downlink signal, $GAP_2$ is the duration for any one of the at least one downlink signal switched to any one of the at least one uplink signal. Specifically, when the level comparison signal $Sd_3$ is on the second logic level and longer than the status counting time $\tau_1$, the status counter 132 switches or transforms the status counting signal $Sd_{31}$ from the first logic level to the second logic level. Therefore, the status counting signal $Sd_{31}$ received by the time-sequence adjuster 134 includes the delay of the status counting time $\tau_1$ on the first logic level. In other words, the time-sequence adjuster 134 advances the time of the status counting signal $Sd_{31}$ switched from the first logic level to the second logic level by a time-sequence adjusting time $\tau_2$, and the delay of the status counting time $\tau_1$ is compensated.

Figure 2E:
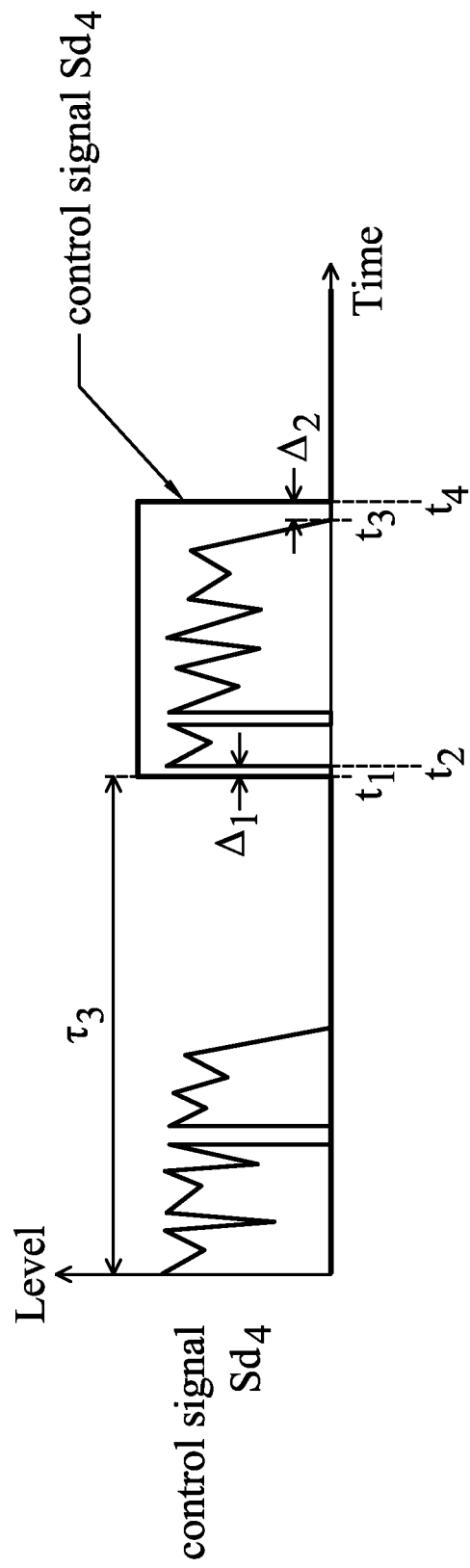
FIG. 2E is the schematic diagram of the output of the delay circuit according to an embodiment of the present disclosure.

In one embodiment, the delay circuit 136 receives the time-sequence adjusting signal $Sd_{32}$. As shown in FIG. 2E, the delay circuit 136 postpones the time-sequence adjusting signal $Sd_{32}$ by a delay time $\tau_3$, and generates a control signal $Sd_4$ synchronized with the coupled downlink signal $Sd_1$. In another embodiment, the coupled downlink signal $Sd_1$ is synchronized with the downlink signal Sd, so that the control signal $Sd_4$ is synchronized with the downlink signal Sd. It should be noted that the range of the delay time $\tau_3$ is:

$$Ts > \tau_3 > Ts - GAP_1/2$$

Ts is the period of a frame. Specifically, a frame includes an uplink signal Su and a downlink signal Sd. In one embodiment, the period of the frame is the sum of the time of the uplink signal Su, the time of the downlink signal Sd, the first switch time $GAP_1$ and the second switch time $GAP_2$.

The delay circuit 136 postpones the time-sequence adjusting signal $Sd_{32}$ by a delay time $\tau_3$, so that the beginning time of the control signal $Sd_4$ advances (i.e., earlier than) the beginning time of the coupled downlink signal $Sd_1$ by a first time $\Delta_1$, and the ending time of the control signal $Sd_4$ postpones (i.e., later than) the ending time of the coupled downlink signal $Sd_1$ by a second time $\Delta_2$. As shown in FIG. 2E, $t_1$ is the beginning time of the control signal $Sd_4$, i.e., the time for the control signal $Sd_4$ switched from the second logic level to the first logic level, $t_2$ is the beginning time of the coupled downlink signal $Sd_1$, $t_3$ is the ending time of the coupled downlink signal $Sd_1$, and $t_4$ is the ending time of the control signal $Sd_4$, i.e., the time for the control signal $Sd_4$ switched from the first logic level to the second logic level. In addition, the ranges of the first time $\Delta_1$ and the second time $\Delta_2$ are:

$$GAP_1/2 > \Delta_1 > 0$$

$$GAP_2/2 > \Delta_2 > 0$$

It should be noted that in this embodiment, the HEU 160 transmits at least one downlink signal Sd. Therefore, the control signal $Sd_4$ generated by the control signal 120 according to the coupled downlink signal $Sd_1$ is synchronized with the coupled downlink signal $Sd_1$ of the next period.

Figure 3:
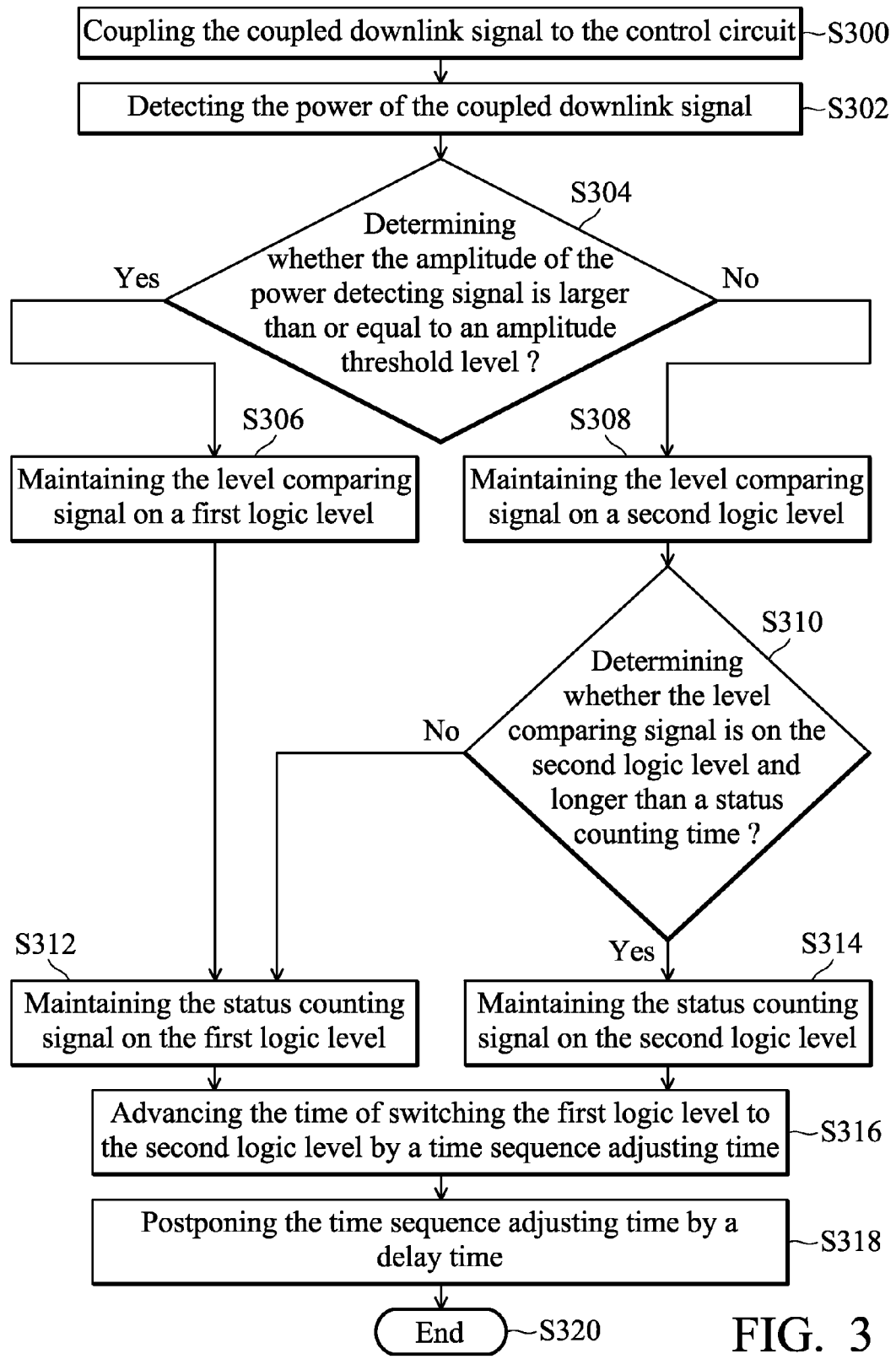
FIG. 3 is a flowchart of the control method for an electronic device according to an embodiment of the present disclosure.

FIG. 3 is a flowchart of the control method for an electronic device according to an embodiment of the present disclosure. Referring to FIG. 3, the control method includes the following steps. In step S300, the coupler 106 couples the coupled downlink signal $Sd_1$ to the power detector 122. In step S302, the detector 122 detects the power of the coupled downlink signal $Sd_1$. In step S304, the level comparator 124 determines whether the amplitude of the power detecting signal $Sd_2$ is greater than or equal to an amplitude threshold level $\lambda_1$. If the amplitude of the power detecting signal $Sd_2$ is greater than or equal to the amplitude threshold level $\lambda_1$, then step S306 is implemented. If the amplitude of the power detecting signal $Sd_2$ is lower than the amplitude threshold level $\lambda_1$, then step S308 is implemented.

In step S306, the level comparator 124 maintains the level comparison signal Sd21 on a first logic level. In step S308, the level comparator 124 maintains the level comparison signal Sd21 on a second logic level, then step S310 is implemented. In step S310, the status counter 132 determines whether the level comparison signal $Sd_3$ is on the second logic level and longer than a status counting time $\tau_1$. If the level comparison signal $Sd_3$ is on the second logic level and longer than a status counting time $\tau_1$, then step S314 is implemented. If the level comparison signal $Sd_3$ is not on the second logic level and longer than a status counting time $\tau_1$, then step S312 is implemented. In step S312, the status counter 132 maintains the status counting signal $Sd_{31}$ on the first logic level. In step S314, the status counter 132 maintains the status counting signal $Sd_{31}$ on the second logic level. In step S316, the time-sequence adjuster 134 advances the time of switching the first logic level to the second logic level by a time-sequence adjusting time $\tau_2$. Afterwards, in step S318, the delay circuit 136 postpones the time-sequence adjusting signal $Sd_{32}$ by a delay time $\tau_3$. Finally, the control method is ended in step S320. The detailed descriptions of the steps of the control method can be referred to in the earlier descriptions and will not be described again here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device, arranged to receive at least one downlink signal and transmit at least one uplink signal, the electronic device comprising:
   a coupler, arranged on a downlink path, and arranged to generate a coupled downlink signal according to the downlink signal from a head-end unit (HEU);
   a transceiver, arranged to switch between the transmission of the downlink signal and the reception of the uplink signal according to a control signal; and
   a control circuit, arranged to:
      receive the coupled downlink signal,
      generate a status counting signal according to a power of the coupled downlink signal, and
      generate the control signal according to the status counting signal and transmit the control signal to the transceiver, wherein only when a level of the coupled downlink signal is lower than an amplitude threshold value and longer than a status counting time, the control circuit advances the time of switching the status control signal from a first logic level to a second logic level opposite to the first logic level by a time sequence adjusting time, otherwise the control circuit maintains the status control signal on the first logic level, and postponing the time sequence adjusting time by a delay time.

2. The electronic device as claimed in claim 1, wherein the control circuit further comprises a control signal generator comprising:
   a status counter, arranged to determine whether a received level comparison signal is switched from the first logic level to the second logic level and generate the status counting signal, wherein the status counting signal is generated according to the coupled downlink signal, and the status counting signal is maintained on the first logic level when the level comparison signal is on the first logic level, and the status counting signal is switched from the first logic level to the second logic level when the level comparison signal is on the second logic level and longer than the status counting time, and the status counting signal is maintained on the first logic level when the level comparison signal is on the second logic level and not longer than the status counting time.

3. The electronic device as claimed in claim 2, wherein the control circuit generator further comprises a time-sequence adjuster, coupled to the status counter, arranged to advance the time of switching the status counting signal from the first logic level to the second logic level by the time-sequence adjusting time for generating a time-sequence adjusting signal.

4. The electronic device as claimed in claim 3, wherein the control circuit generator further comprises a delay circuit, coupled to the time-sequence adjuster, and arranged to postpone the time-sequence adjusting signal by the delay time for generating the control signal synchronized with the downlink signal.

5. The electronic device as claimed in claim 4, wherein the status counting time is greater than or equal to a duration of a resource block.

6. The electronic device as claimed in claim 4, wherein a range of the time-sequence adjusting time is:

$$\tau_1 > \tau_2 > \tau_1 - (GAP_1 + GAP_2)/2$$

wherein $\tau_2$ is the time-sequence adjusting time, $\tau_1$ is the status counting time, $GAP_1$ is a duration for any one of the at least one uplink signal switched to any one of the at least one downlink signal, and $GAP_2$ is a duration for any one of the at least one downlink signal switched to any one of the at least one uplink signal.

7. The electronic device as claimed in claim 4, wherein a range of the delay time is:

$$Ts > \tau_3 > Ts - GAP_1/2$$

Wherein $\tau_3$ is the delay time, Ts is a period of a frame, and $GAP_1$ is a duration for any one of the at least one uplink signal switched to any one of the at least one downlink signal.

8. The electronic device as claimed in claim 7, wherein a beginning time of the control signal advances a beginning time of the coupled downlink signal by a first time, and an ending time of the control signal postpones an ending time of the coupled downlink signal by a second time, the ranges of the first time $\Delta_1$ and the second time $\Delta_2$ are:

$$GAP_1/2 > \Delta_1 > 0$$

$$GAP_2/2 > \Delta_2 > 0$$

Wherein $\Delta_1$ is the first time, $\Delta_2$ is the second time, and $GAP_2$ is a duration for any one of the at least one downlink signal switched to any one of the at least one uplink signal.

9. The electronic device as claimed in claim 2, wherein the control circuit further comprises a power detector coupled the coupler and arranged to detect a power of the coupled downlink signal for generating a power detecting signal.

10. The electronic device as claimed in claim 9, wherein the control circuit further comprises a level comparator coupled between the power detector and the control signal generator and arranged to generate the level comparison signal according to the power detecting signal, wherein the level comparator maintains the level comparison signal on the first logic level when the level of the power detecting signal is greater than or equal to the amplitude threshold value, and the level comparator maintains the level comparison signal on the second logic level when the level of the power detecting signal is lower than the amplitude threshold value.

11. The electronic device as claimed in claim 1, further comprising an antenna coupled to the transceiver, and arranged to receive the downlink signal transmitted by the transceiver or transmit the received uplink signal to the transceiver.

12. The electronic device as claimed in claim 4, wherein the control signal generator is implemented by a field programmable gate array (FPGA) or a microprocessor.

13. The electronic device as claimed in claim 1, wherein the electronic device is a remote antenna unit (RAU).

14. A control method, applied to an electronic device receiving at least one downlink signal and transmitting at least one uplink signal, wherein the electronic device comprises a coupler arranged on a downlink path, a transceiver and a control circuit, the control method comprising:
   generating a coupled downlink signal according to the downlink signal from a HEU;
   generating a status counting signal according to a power of the coupled downlink signal, wherein only when a level of the coupled downlink signal is lower than an amplitude threshold value and longer than a status counting time, the control circuit advances the time of switching the status control signal from a first logic level to a second logic level opposite to the first logic level by a time sequence adjusting time, otherwise the control circuit maintains the status control signal on the first logic level, and postponing the time sequence adjusting time by a delay time;
   generating a control signal according to the status counting signal and transmitting the control signal to the transceiver by the control circuit; and
   switching between the transmission of the downlink signal and the reception of the uplink signal according to the control signal.

15. The control method as claimed in claim 14, wherein the step of generating the status counting signal according to the power of the coupled downlink signal further comprising:
   determining whether a level comparison signal is switched from the first logic level to the second logic level wherein the level comparison signal is generated according to the coupled downlink signal;
   maintaining the status counting signal on the first logic level when the level comparison signal is on the first logic level;
   switching the status counting signal from the first logic level to the second logic level when the level comparison signal is on the second logic level and longer than the status counting time; and maintaining the status counting signal on the first logic level when the level comparison signal is on the second logic level and not longer than the status counting time.

16. The control method as claimed in claim 15, further comprising advancing the time of switching the status counting signal from the first logic level to the second logic level by the time-sequence adjusting time for generating a time-sequence adjusting signal.

17. The control method as claimed in claim 16, wherein the step of postponing the time-sequence adjusting signal by the delay time generates the control signal synchronized with the downlink signal.

18. The control method as claimed in claim 17, wherein the status counting time is greater than or equal to a duration of a resource block.

19. The control method as claimed in claim 17, wherein a range of the time-sequence adjusting time is:

$$\tau_1 > \tau_2 > \tau_1 - (GAP_1 + GAP_2)/2$$

wherein $\tau_2$ is the time-sequence adjusting time, $\tau_1$ is the status counting time, $GAP_1$ is a duration for any one of the at least one uplink signal switched to any one of the at least one downlink signal, and $GAP_2$ is a duration for any one of the at least one downlink signal switched to any one of the at least one uplink signal.

20. The control method as claimed in claim 17, wherein a range of the delay time is:

$$Ts > \tau_3 > Ts - GAP_1/2$$

Wherein $\tau_3$ is the delay time, Ts is a period of a frame, and $GAP_1$ is a duration for any one of the at least one uplink signal switched to any one of the at least one downlink signal.

21. The control method as claimed in claim 20, wherein a beginning time of the control signal advances a beginning time of the coupled downlink signal by a first time, and an ending time of the control signal postpones an ending time of the coupled downlink signal by a second time, the ranges of the first time $\Delta_1$ and the second time $\Delta_2$ are:

$$GAP_1/2 > \Delta_1 > 0$$

$$GAP_2/2 > \Delta_2 > 0$$

Wherein $\Delta_1$ is the first time, $\Delta_2$ is the second time, and $GAP_2$ is a duration for any one of the at least one downlink signal switched to any one of the at least one uplink signal.

22. The control method as claimed in claim 15, further comprising detecting a power of the coupled downlink signal for generating a power detecting signal.

23. The control method as claimed in claim 22, further comprising generating the level comparison signal according to the power detecting signal, wherein the level comparator maintains the level comparison signal on the first logic level when the level of the power detecting signal is greater than or equal to the amplitude threshold value, and the level comparator maintains the level comparison signal on the second logic level when the level of the power detecting signal is lower than the amplitude threshold value.

* * * * *